United States Patent [19]

Bush et al.

[11] Patent Number: 5,265,162
[45] Date of Patent: Nov. 23, 1993

[54] PORTABLE PIN CARD

[76] Inventors: George Bush, 1675 York Ave., Ste. 34B, New York, N.Y. 10128; Estelle Ross, 41 Buxton St., Lido Beach, N.Y. 11561; Robert Belfield, 104 Benson Ave., Sayville, N.Y. 11782

[21] Appl. No.: 762,598

[22] Filed: Sep. 19, 1991

Related U.S. Application Data

[62] Division of Ser. No. 465,476, Jan. 16, 1990, Pat. No. 5,130,519.

[51] Int. Cl.⁵ ............................................. H04K 1/00
[52] U.S. Cl. .................................................... 380/24
[58] Field of Search ......................................... 380/24

[56] References Cited

U.S. PATENT DOCUMENTS 5,130,519  7/1992  Bush et al. ................. 380/24

Primary Examiner—David C. Cain
Attorney, Agent, or Firm—Kane, Dalsimer, Sullivan, Kurucz, Levy, Eisele, & Richard

[57] ABSTRACT

A portable Personal Identification Card allows a cardholder to enter a PIN code into his card at a location remote from an authorization terminal. In an alternate embodiment, a PIN code may be entered at the authorization terminal. The authorization terminal reads the cardholder's account number from the PIN card. The account number is transmitted to a central computer which uses this number to index into memory to find a personal identification number and encryption parameters. The central computer transmits a pseudo-random number to the PIN Card. Both the PIN Card and the central computer perform an encryption of a function of the corresponding personal identification number and pseudo-random number to derive a CGIPIN (Computer Generated Image of the PIN). If the CGIPIN transmitted from the PIN card matches the CGIPIN of the central computer, access is authorized.

3 Claims, 5 Drawing Sheets

FIG. 4

| 0 | 1 | 2 | 3 | 4 | 5 | 6 | 7 | 8 | 9 |
|---|---|---|---|---|---|---|---|---|---|
| 2 | 5 | 1 | 2 | 9 | 5 | 6 | 3 | 3 | 9 |
| 6 | 7 | 4 | 7 | 7 | 3 | 0 | 5 | 6 | 7 |
| 0 | 8 | 7 | 5 | 0 | 2 | 8 | 8 | 9 | 5 |
| 9 | 6 | 0 | 9 | 6 | 6 | 3 | 1 | 0 | 3 |
| 5 | 9 | 9 | 3 | 8 | 1 | 9 | 4 | 1 | 0 |
| 4 | 3 | 6 | 0 | 3 | 8 | 2 | 6 | 7 | 6 |
| 7 | 2 | 3 | 6 | 5 | 0 | 7 | 7 | 4 | 1 |
| 1 | 4 | 5 | 4 | 2 | 4 | 4 | 2 | 5 | 4 |
| 3 | 0 | 2 | 1 | 4 | 9 | 1 | 0 | 8 | 8 |
| 8 | 1 | 8 | 8 | 1 | 7 | 5 | 9 | 2 | 2 |
| 2 | 5 | 1 | 2 | 9 | 5 | 6 | 3 | 3 | 9 |
| 6 | 7 | 4 | 7 | 7 | 3 | 0 | 5 | 6 | 7 |
| 0 | 8 | 7 | 5 | 0 | 2 | 8 | 8 | 9 | 5 |
| 9 | 6 | 0 | 9 | 6 | 6 | 3 | 1 | 0 | 3 |
| 5 | 9 | 9 | 3 | 8 | 1 | 9 | 4 | 1 | 0 |
| 4 | 3 | 6 | 0 | 3 | 8 | 2 | 6 | 7 | 6 |
| 7 | 2 | 3 | 6 | 5 | 0 | 7 | 7 | 4 | 1 |
| 1 | 4 | 5 | 4 | 2 | 4 | 4 | 2 | 5 | 4 |
| 3 | 0 | 2 | 1 | 4 | 9 | 1 | 0 | 8 | 8 |
| 8 | 1 | 8 | 8 | 1 | 7 | 5 | 9 | 2 | 2 |

PORTABLE PIN CARD

This is a divisional of copending application(s) Ser. No. 07/465,476 filed on Jan. 16, 1990, now U.S. Pat. No. 5,130,519, issued Jul. 19, 1992.

This invention is related to application Ser. No. 279,479, now abandoned, filed Dec. 2, 1988 which is a continuation-in-part application of Ser. No. 082,575, filed Aug. 6, 1987, now abandoned.

BACKGROUND OF THE INVENTION

1. Field of the Invention

The invention relates to a portable Personal Identification Number (PIN) card which allows a user to enter a PIN code at a location remote from an authorization terminal. The PIN number is entered into volatile RAM and will remain active for some finite period of time. The PIN, along with a random number input from a remote computer is processed through a code matrix contained within the card to generate an image of the PIN (CGIPIN), which can be compared at either the authorization terminal or at a remote computer.

2. Description of the Prior Art

Credit card fraud has become an ever growing problem in recent years. Another development has been the rapid onset of electronic fund transfer through the use of bank debit cards. As a protection against fraud, it is widely held that a PIN is one of the best methods for providing the cardholder and the issuer of the card with good security.

The PIN is known only to the cardholder and the card company. When the cardholder desires access to funds, he must identify himself to the credit card company's computer through the combination of the card and his PIN code. This system is familiar to anyone who uses automatic bank teller machines. However, the PIN code is vulnerable to public visibility.

The use of a PIN code is limited to situations where a user is physically present at an authorization terminal. This rules out the use of a PIN code in many desirable service areas where it is awkward for the cardholder to come to a fixed authorization terminal. A restaurant is one such example. This is the current state of affairs when the use of PIN codes is integrated with debit or credit cards.

A chip card with an on-board keypad can be used to circumvent this problem. Current versions of chip cards utilize a permanently stored PIN code. However, it is undesirable that the PIN code be permanently stored within the card. It is also undesirable for the PIN code to be transmitted over communication lines because it is possible with sophisticated electronic interrogation to extract a cardholder's PIN code.

It is therefore an object of this invention that the cardholder's PIN is never permanently stored in the chip card and is never transmitted over communications lines.

It is therefore an object of this invention to allow a remote central computer facility or an authorization terminal to validate a cardholder's identity through the use of a PIN code entered into a chip card by the cardholder at the time of the desired validation.

It is therefore a further object of this invention that the remote facility can communicate safely with a central computer by means of ordinary non-protected communication lines.

It is therefore a further object of this invention that the system have sufficient mobile capabilities so as to allow a user to enter the PIN at various locations, such as at any of the tables in a restaurant.

SUMMARY OF THE INVENTION

The invention comprises three components, (1) the Portable PIN Card itself, which is a chip card that contains a matrix based encryption system, (2) an authorization terminal, which allows the PIN Card to interact with, (3) a central computer.

The PIN Card may be implemented in several ways. It may be used simply as identification, (as one would use a driver's license), it may be integrated with one credit or debit card and, it might be integrated with multiple credit/debit cards. To combine the PIN Card function with a credit or debit card, one would need a lender's proprietary information encoded on the PIN Card. Alternately, the PIN card function could be integrated with that of a conventional chip card.

As an example, when a waiter collects a user's credit and PIN card and the bill, the cardholder would have previously entered his PIN code using the keypad 5. The waiter would then process the credit card in the usual manner, but would also place the PIN Card in an authorization terminal. The authorization terminal scans the PIN Card for an account number which is sent off to a central computer. The central computer sends back a pseudo-random number which is used by the card to produce a CGIPIN. The central computer also produces a CGIPIN using a duplicate process. The authorization terminal sends the CGIPIN to the central computer. If the CGIPINs match, authorization is granted. Note that while the authorization terminal could make the comparison, for better security, the central computer should make the comparison. Additionally, note that the cardholder's PIN code never leaves the PIN Card. It is the CGIPIN, a number derived from the user's PIN code, a unique array matrix, and a constantly changing pseudo-random number generated by the central computer, that is transmitted by the PIN Card.

Both the central computer and the PIN Card have identical copies of this unique array matrix. Since each user's matrix could be unique, figuring out one matrix would be of no use to a thief. The card and the central computer also contain an identical algorithm which is used to generate the CGIPIN. A thief could know the algorithm, but without the array matrix, the user's PIN, and the ever-changing pseudo-random number, there is no way he could generate the required CGIPIN.

The user's PIN and the array matrix are in the PIN Card in RAM. Any attempt to read them would cause their destruction because of the way the system is constructed. As a further measure of protection, the cardholder's PIN will be dissipated a short time after entry. Five minutes would be typical.

Note that while the above example uses separate PIN and credit cards, as mentioned previously, the two could be combined for ease of use.

BRIEF DESCRIPTION OF THE DRAWINGS

FIG. 4 illustrates a possible encoding matrix.

DETAILED DESCRIPTION OF THE PREFERRED EMBODIMENT

Figures 1, 2:
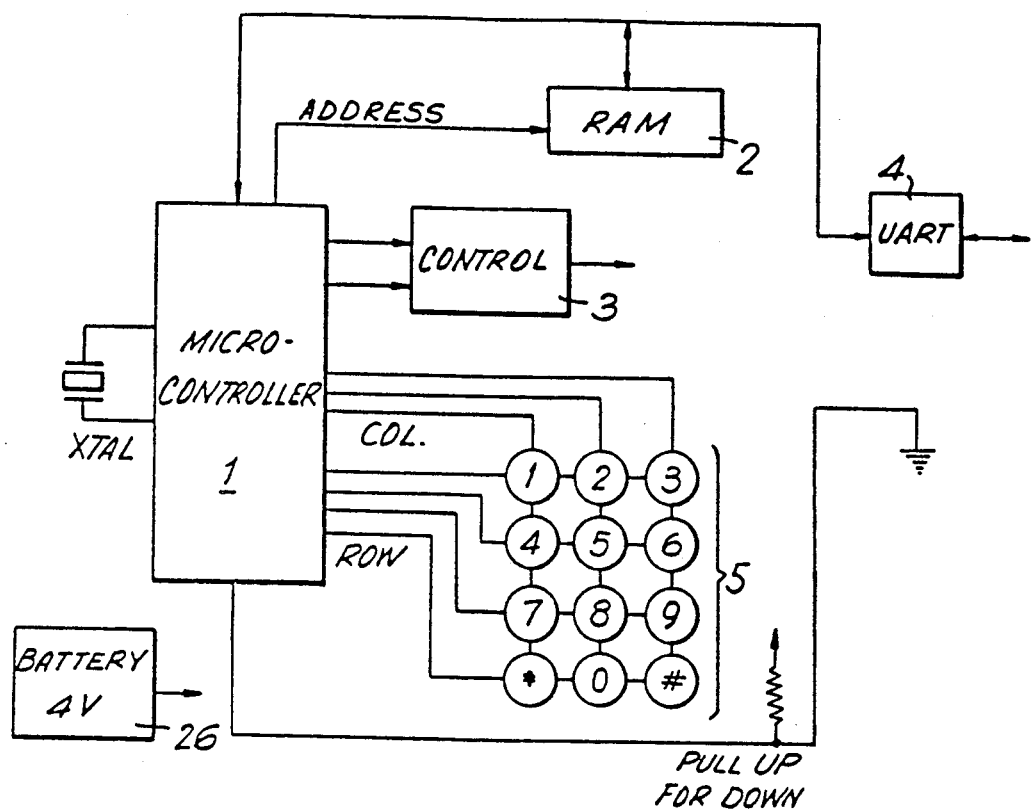
FIG. 1 shows a schematic of the Portable PIN Card.
FIG. 2 shows the face of the PIN Card.
Figure 3:
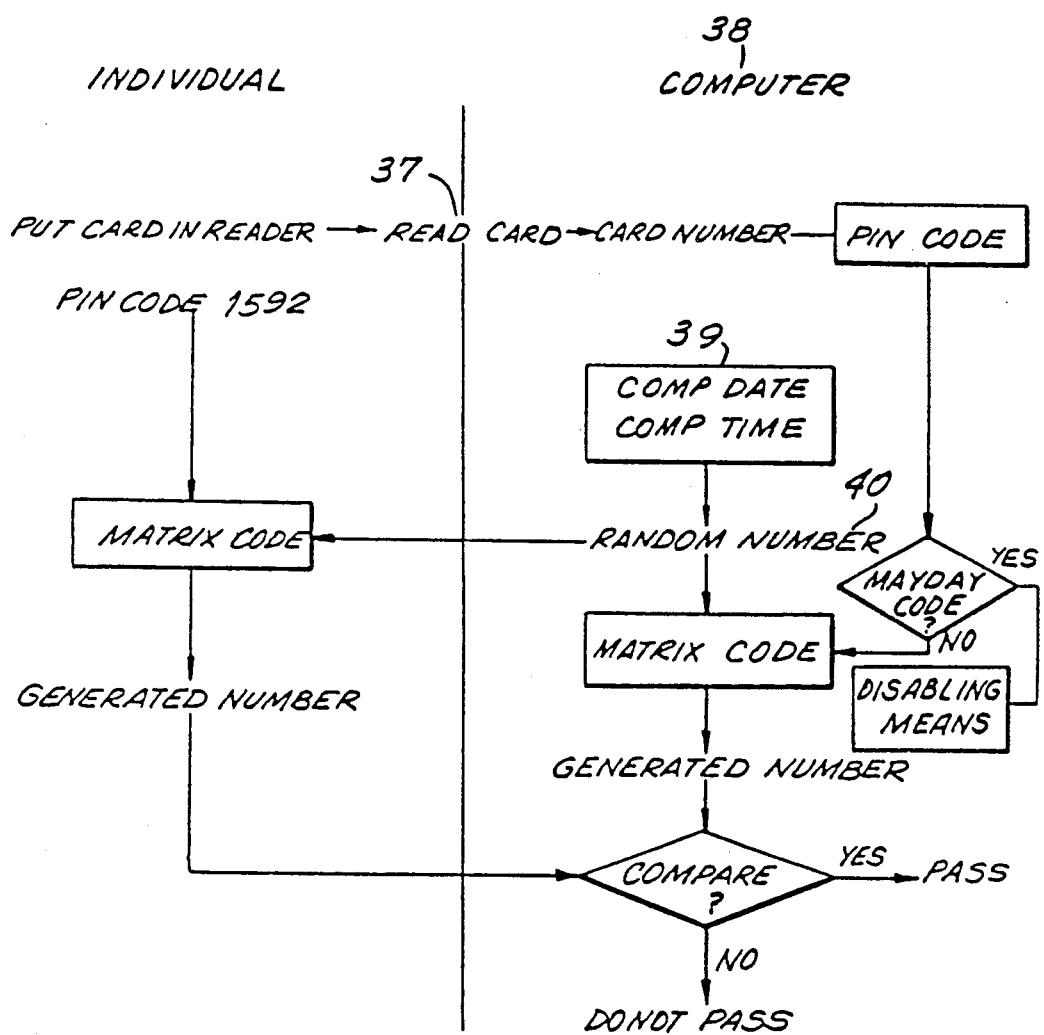
FIG. 3 shows the communications flowchart between the authorization terminal and the central computer.

FIG. 1 shows the basic circuit of the PIN Card. The microcontroller 1 is a microcomputer system that contains control software and means to interface with the keypad 5 and RAM 2. It also contains software necessary to communicate with the authorization terminal and implement encryption.

The keypad 5 might typically be a membrane type unit feeding directly into the microcontroller 1. The RAM 2 is used to store the matrix and other encryption parameters: i.e., the user's PIN code and the random number, as they come in from their input points. In this case, the RAM is a static RAM and must be powered by a battery 26 so as not to lose the matrix. The battery might be a lithium button cell.

The UART 4 (which could be a USART) is used to tailor data from the microcontroller 1 into a form required for communication with authorization terminals.

Figure 5:
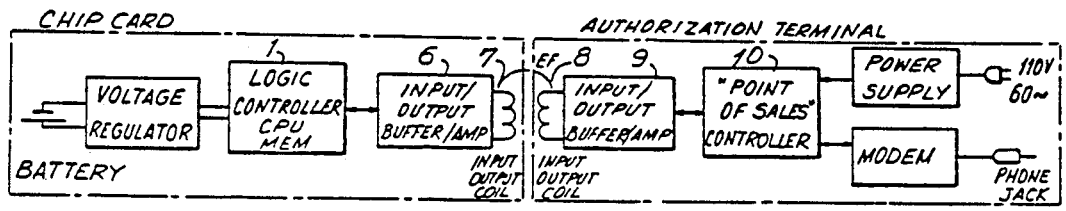
FIG. 5 illustrates communication via induction.
Figure 9:
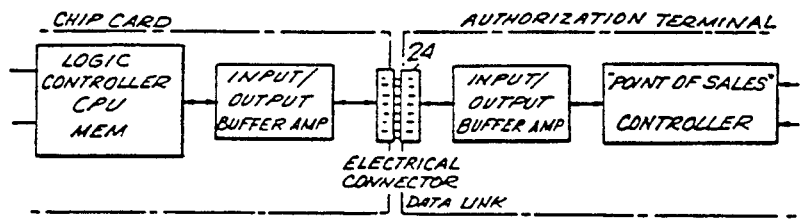
FIG. 9 illustrates communication via a pin connector.
Figure 10:
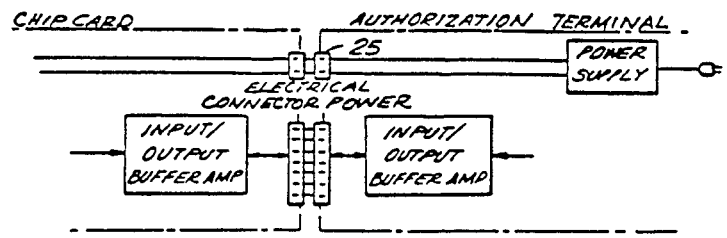
FIG. 10 illustrates power transfer via a pin connector.

The interface between the PIN Card and the authorization terminal is critical. If there is an electrical connection between the two units, as shown in FIGS. 9 and 10, the system is subject to problems caused by contamination and static discharge. FIG. 5 is a circuit which allows the PIN Card to communicate with the authorization terminal by means of induction. This allows communication without direct electrical contact thus rendering the system impervious to water, dirt, and static discharge. The PIN Card contains an input-output buffer/amp 6 as does the authorization terminal as shown by element 9. The purpose of this unit is to condition signals received from the microcontroller 1, for output, and to condition the output from the input/output coil 7. These signals will be weak and must be amplified for good communication. The authorization terminal has an identical input/output pair including input/output coil 8 and input-output buffer/amp 9.

For error free communication, one input/output pair must be quiescent while the other pair is active and vice versa. Communications protocols must schedule data flow so that both pairs are not in conflict with each other.

Figure 6:
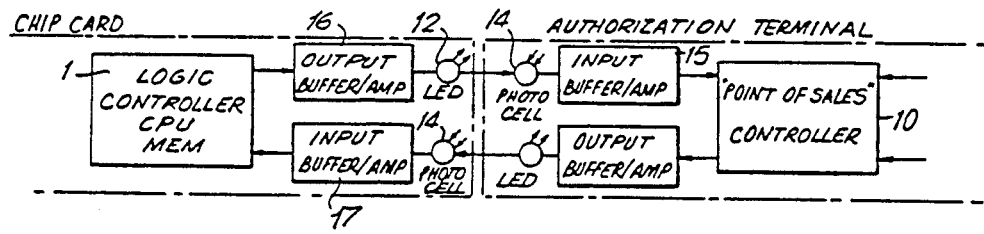
FIG. 6 illustrates opto-electric communication.

FIG. 6 shows a communication system based on opto-electric principles. The PIN Card has an on-board LED 12 for data output and a photocell 14 for data reception. Signals from the microcontroller would have to be conditioned by the buffer/amplifier 16 before being output. Input signals from the photocell would have to be conditioned by a similar buffer/amplifier 17 before sending the data to the microcontroller 1.

The authorization terminal has a similar (positionally opposite) input/output pair. Data from the PIN Card will be converted into a series of light impulses by the LED 12 and will be picked up and converted into electrical signals by the photocell 14 in the authorization terminal. This weak electrical signal will have to be conditioned by the input buffer/amplifier 15 before it can be sent on to the authorization terminal microcontroller 10.

Figure 7:
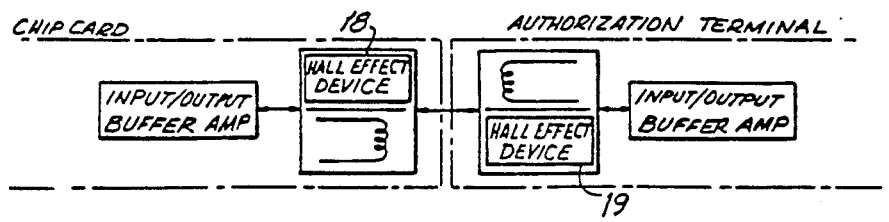
FIG. 7 illustrates communication by a Hall Effect Device.

FIG. 7 shows communications via Hall Effect Devices. A Hall Effect Device senses changes in magnetic flux density. In this application, the Hall Effect Device serves as a data receptor while a coil might serve as the data transmitter. The PIN Card and the authorization terminal each contain a transmitter/receptor pair 18 and 19. As in the previous cases, communications protocols must coordinate the timing of data transfer.

Figure 8:
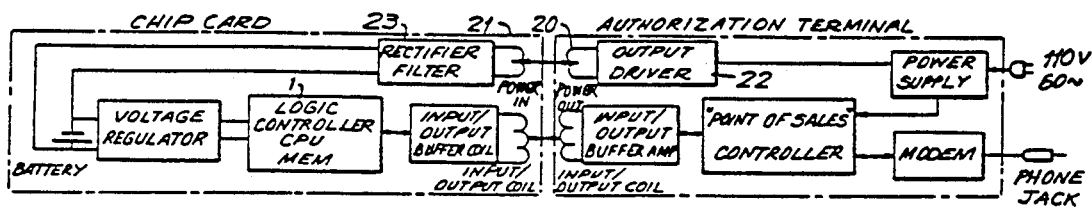
FIG. 8 illustrates power transfer by induction.

The battery 26 (FIG. 1) is meant only to maintain RAM and to allow non-connected entry of a user's PIN code. If a PIN Card is powered by an external source, while communicating with an authorization terminal, its on-board battery will have a greatly extended life. FIG. 8 shows a non-contact method of powering the PIN Card while it is in the authorization terminal. The addition of outside power also makes the communication techniques shown in FIGS. 5, 6, and 7 more practical.

FIG. 8 shows the communication technique of FIG. 5 teamed with an inductive power transfer method. A magnetic field, created by a coil 20 in the authorization terminal, cuts across a coil in the PIN Card 21 and induces an electrical current. The output driver 22 and the rectifier/filter 23 are needed to tailor the power for use by the microcontroller 1. The advantage of inductive coupling is that the environment and the state of the card (dirt, scratches, etc.) have no effect on system operation.

This is not the case with cards that have electrical contacts. Static discharge is also a problem with contact cards. If a use were to touch the contacts after building up a static charge, (by walking across a rug, for example), he could damage the card's on-board chip.

FIG. 9 shows a chip card to terminal connection as most cards are configured today. The interface 24 consists of simple metallic patches on the card and wiper contacts in the authorization terminal.

FIG. 10 shows a contact type communication interface paired with a contact type power transfer interface 25. This is a common configuration for chip cards today and has all the liabilities of electrical contacts mentioned previously.

The CGIPIN is generated in the following manner. FIG. 4 is an example of a two dimensional matrix that might be carried in a PIN Card and a central computer. It consists of ten columns of twenty numbers each. The columns repeat themselves after the first ten digits. The central computer also contains the user's PIN code, in this example 2548. As an example, when the central computer receives a signal indicating that an authorization is required, it generates and outputs a pseudo-random number that is one digit longer than the user's PIN code, in this case 48901. The pseudo-random number may be generated by any seed. Time of day was used in this example.

The first digit of the pseudo-random number represents the offset used when working the matrix. In this example, the offset is 4. The rest of the digits call out the numbers of the columns in the matrix to be used in generating the CGIPIN. In this example, column 8 is used first, column 9 is used second, etc.

To work the matrix, one locates the first digit of the cardholder's PIN code in column 8, then looks down 4 more numbers, (the offset), to come up with the digit 0, the first digit of the CGIPIN. The process is followed through with the rest of the cardholder's PIN code and the resulting CGIPIN is 0182. This process is being duplicated by the user's PIN Card. The CGIPIN, 0182, not the user's PIN, is output by the PIN card to the central computer for comparison with the reference CGIPIN.

Referring to FIGS. 4, 4A, 4B and 4C, the pseudo-random number is 48901, and PIN code is 2548, the offset, which is the first digit of the pseudo-random number, is 4, and the direction of the offset is "down".

Since the pseudo-random number is changed for each verification, tapping the communication lines would not allow an intruder to determine the components needed to generate the CGIPIN.

While the matrix used in this example is two dimensional, and the offset is simple, one could use a multi-dimensional matrix and a multipath offset to complicate the process. It should also be said that the algorithm and matrix could be changed at will.

We have used the example of a restaurant. The card can be used in other situations such as gaining access to restricted areas and equipment.

Additionally, the user may enter an optional "Mayday" PIN code into the PIN Card in emergency cases, such as an access made under duress. When the central computer determines that the PIN code entered into the PIN Card matches the "Mayday" PIN code which was previously placed in the central computer, the central computer would take appropriate action, such as notifying the police. To protect the cardholder, the system would appear to operate normally until such time as the criminal is apprehended.

Other embodiments of this invention might include a PIN Card without a keypad. While the Pin Card system was designed with a card having an on-board keypad, an alternative embodiment of the invention includes a fixed keypad at the merchant's place of business. With the embodiment using the fixed keypad system, the merchant would place the card in an authorization terminal and ask the customer to enter his PIN on the fixed pad at the proper time. The user's PIN is sent to the card from the fixed keypad and then the system operates as has been previously described.

As a further alternative, in addition to a fixed PIN pad, a merchant might want to use a portable PIN pad. This unit has a keypad that communicates with an authorization terminal by remote means such as infra-red. The user enters his PIN on the keypad of the portable PIN pad, then gives his PIN Card and the PIN pad to the merchant. The PIN Card and the PIN pad are inserted in the authorization terminal. The system then operates as has been previously described.

In conclusion, the Pin Card System offers up to three levels of security.

1. The top level of security for the PIN Card system uses a PIN Card with an on-board keypad. The user enters his PIN directly into the card. There is no transmission of the PIN from the card, so that there is no chance that a thief could get the user's PIN by tapping the authorization terminal's communication line. A thief could steal the PIN Card, but without the PIN, (which is present in the card for only a short time), there could be no access to a user's account.

2. A middle level of security involves the use of a keypad remote from the PIN Card. In this case, a sophisticated thief could obtain the PIN by tapping the remote keypad. The thief would still have to steal the user's PIN Card to gain access to accounts, but his knowledge of the PIN removes a level of security from the system.

3. The lowest level of security involves the use of a card without a user entered PIN. In this case, the thief need only steal the card to gain access to a user's account.

All levels of security are immune to counterfeiting of the card because the encryption system is complex enough to render computerized interrogation of the card impractical. The card could be configured so as to self-destruct upon repeated interrogation within a set time. Also, the matrix and the algorithm are kept in RAM so any attempt to gain knowledge through card disassembly would be pointless.

All levels are immune to tapping of communication lines to the central computer because the numbers sent back and forth change with every verification. In addition, at all three levels of security, it is impossible to gain authorization without use of the actual card.

Obviously, many modifications and variations of the invention are possible in light of the above description. It is therefore to be understood that within the scope of the appended claims, the invention may be practiced otherwise than as specifically described.

We claim:

1. A security apparatus comprising:

at least one first computerized information center means, first digitized data generated by said first computerized information center means including an account number, first encryption parameters and first algorithm stored in protected RAM;

means for entering a first PIN code into protected storage;

second computerized information center means which stores, for each of said first computerized information center means, a reference PIN code, reference encryption parameters and a reference algorithm, wherein said reference encryption parameters and said reference algorithm are identical to said first encryption parameters and said first algorithm, respectively, stored in said first computerized information center means;

said second computerized information center means including pseudo-random number generating means;

wherein said second computerized information center means uses said communicated account number to access and retrieve said reference PIN code and said reference encryption parameters, retrieves a pseudo-random number from said pseudo-random number generating means, transmits said pseudo-random number to said first computerized information center means, uses said reference encryption parameters and said reference algorithm to encrypt a function of said reference PIN code and said pseudo-random number to derive a first CGIPIN;

wherein said first computerized information center means uses said first encryption parameters and said first algorithm to encrypt a function of said pseudo-random number and said first PIN in said protected storage in order to derive a second CGIPIN;

comparing means for comparing said first CGIPIN to said second CGIPIN, including means for alerting a user whether or not said first CGIPIN and said second CGIPIN match;

wherein said first computerized information center means and reference encryption parameters define a multidimensional matrix employed by said first computerized information center means and reference algorithms wherein one or more digits of said pseudo-random number serve as an offset into the matrix.

2. A security apparatus comprising:

at least one first computerized information center means, first digitized data generated by said first computerized information center means, said first digitized data including an account number, first encryption parameters and first algorithm stored in protected RAM;

means for entering a first PIN code into protected storage;

second computerized information center means which stores, for each of said first computerized information center means, a reference PIN code, reference encryption parameters and a reference algorithm, wherein said reference encryption parameters and said reference algorithm are identical to said first encryption parameters and said first algorithm, respectively, stored in said respective first computerized information center means;

said second computerized information center means including pseudo-random generating means;

wherein said second computerized information center means uses said communicated account number to access and retrieve said reference PIN code and said reference encryption parameters, retrieves a pseudo-random number from said pseudo-random number to said first computerized information center means, uses said reference encryption parameters and said reference algorithm to encrypt a function of said reference PIN code and said pseudo-random number to derive a first CGIPIN;

wherein said first computerized information center means uses said first encryption parameters and said first algorithm to encrypt a function of said pseudo-random number and said first PIN in said protected storage in order to derive a second CGIPIN;

comparing means for comparing said first CGIPIN to said second CGIPIN, including means for alerting a user whether or not said first CGIPIN and said second CGIPIN match;

wherein said first computerized information center means and reference encryption parameters define a matrix employed by said first computerized information center means and reference algorithms;

wherein the matrix comprises columns of 20 numbers 0-9 in arbitrary order which is repeated after the first ten digits;

wherein one and only one incident of each digit 0-9 is used per half column;

one or more digits of said pseudo-random number serves as an offset into the matrix, while remaining digits serve to name the columns used to calculate said CGIPIN.

3. A security apparatus comprising:

at least one first computerized information center means, without an encoded PIN number therein, for generating first digitized data, first encryption parameters and first algorithm stored in protected RAM;

means for entering an encoded number in said first computerized information center means;

means for entering a first PIN code into protected storage;

a second computerized information center means which stores, for each of said first computerized information center means, a reference PIN code, reference encryption parameters and a reference algorithm, wherein said reference encryption parameters and said reference algorithm are identical to said first encryption parameters and said first algorithm, respectively, stored in said first computerized information center means;

said second computerized information center means including pseudo-random number generating means;

wherein said second computerized information center means uses said communicated account number to access and retrieve said reference PIN code and said reference encryption parameters, retrieves a pseudo-random number from said pseudo-random number generating means, transmits said pseudo-random number to said first computerized information center means, uses said reference encryption parameters and said reference algorithm to encrypt a function of said reference PIN code and said pseudo-random number to derive a first CGIPIN;

wherein said first computerized information center means uses said encryption parameters and said algorithm to encrypt a function of said pseudo-random number and said first PIN in said protected storage in order to derive a second CGIPIN;

comparing means for comparing said first CGIPIN to said second CGIPIN, including means for alerting a user whether or not said first CGIPIN and said second CGIPIN match; and wherein said first computerized information center means and reference encryption parameters define a multidimensional matrix employed by said first computerized information center means and reference algorithms wherein one or more digits of said pseudo-random number serve as an offset into said matrix.

* * * * *